(12) United States Patent  
Yajima (10) Patent No.: US 6,571,450 B2
(45) Date of Patent: Jun. 3, 2003

(54) PROCESS FOR THE MONOLITHIC MOLDING OF SUPERPLASTIC MATERIAL

(75) Inventor: Shinichi Yajima, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 20 days.

(21) Appl. No.: 09/897,420

(22) Filed: Jul. 3, 2001

(65) Prior Publication Data

US 2002/0014101 A1 Feb. 7, 2002

(30) Foreign Application Priority Data

Jul. 3, 2000 (JP) .................................... 2000-201110

(51) Int. Cl.$^7$ ................................................ B23P 17/00
(52) U.S. Cl. ...................... 29/421.1; 29/897.2; 72/60; 72/61
(58) Field of Search ........................... 29/421.1, 897.2, 29/889.72; 72/60, 58, 61, 62

(56) References Cited

U.S. PATENT DOCUMENTS 5,330,092 A * 7/1994 Gregg et al.
5,881,459 A * 3/1999 Yasui .......................... 29/421.1

FOREIGN PATENT DOCUMENTS

JP         11169977 A      6/1999

* cited by examiner

Primary Examiner—P. W. Echols
(74) Attorney, Agent, or Firm—Smith, Gambrell & Russell, LLP (57) ABSTRACT

In the process for the monolithic molding of superplastic material, generation of wrinkles on the molded product can be prevented by avoiding local expansion generated in the no-bonding regions of both of three or more metal plates when the metal plates are monolithically molded by means of superplastic molding. The process is characterized in that auxiliary plates for molding are placed on both sides of the superposed plates through the no-bonding regions, these plates are set in the molding die, and a pressure lower than applied to the non-bonding regions is applied to spaces between inner wall of the molding die and the auxiliary plates to control movement of the top and bottom.

4 Claims, 9 Drawing Sheets

PROCESS FOR THE MONOLITHIC MOLDING OF SUPERPLASTIC MATERIAL

BACKGROUND OF THE INVENTION

1. Field of the Invention

The present invention relates to a process for the monolithic molding of superplastic material by techniques such as superplastic molding and if necessary diffusion bonding using products having three or more layer-structure made up of metal plates such as titanium alloy, to produce the products used for parts that require particular a heat-resistance is required (e.g., body structure of airplane).

2. Description of the Related Art Including Information Disclosed Under 37 CFR 1.97 and 1.98

Metals and alloys such as titanium and most of its alloys and nickel alloys have superplasticity characteristics. For instance, it is known that titanium alloys having appropriate compositions provide elongation of 300%. The superplastic materials can be rather easily molded using a superplastic molding process to provide products having even extremely complicated shape.

A process for monolithic molding of the above superplastic material using techniques of superplastic molding and diffusion bonding, is concretely explained with reference to FIGS. 14 to 17.

Figure 14:
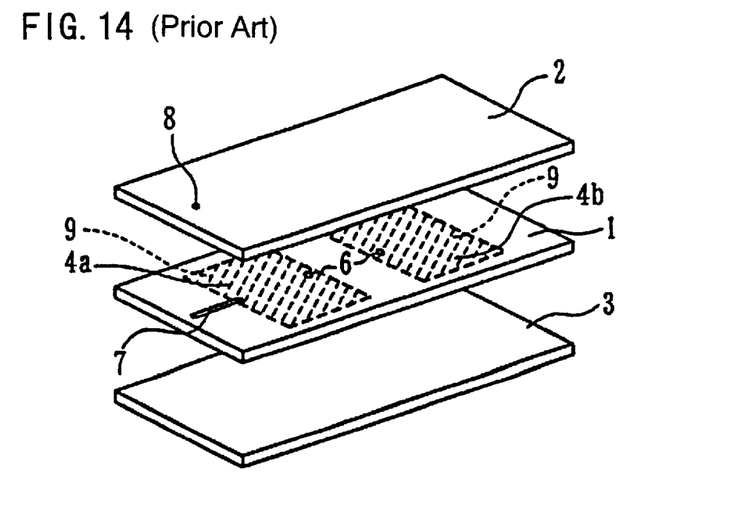
FIG. 14 is a perspective view for explaining a conventional process for the monolithic molding of superplastic metal.
Figure 15:
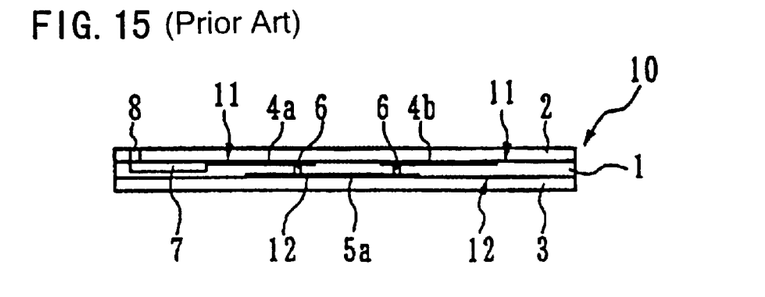
FIG. 15 is a section view of feature for explaining the conventional process.

As shown in FIG. 14, three metal plates having superplasticity (e.g., titanium sheets) 1, 2 and 3 are provided. In case the sheets 1, 2 and 3 are superposed as indicated in FIG. 15, non-bonding regions 4a and 4b are provided on one side (i.e., surface of the sheet 1 intermediately located between the sheets 2 and 3) and a non-bonding region 5a is provided on the other side such that a part of the non-bonding region 5a is overlapped with parts of the non-bonding regions 4a and 4b as seen on a plane surface. On portions that the non-bonding regions 4a and 4b are overlapped with the non-bonding region 5a as seen on the plane surface, gas holes 6 are provided beforehand respectively, and further a groove for introducing molding gas 7 is formed in contact with one end of the non-bonding region 4a.

A core-sheet 1, which is the above intermediate metal plate, is put between face sheets 2, 3, which are the above top and bottom metal plates. A hole for feeding molding gas 8 is provided in the face sheet 2. The hole for feeding molding gas 8 is connected to one end of a passage for introducing molding gas, which is formed by the groove for introducing molding gas 7 and the face sheet 2 by superposing the face sheet 2 on the core sheet 1.

An anti-bonding agent 9 (e.g., Yttria) is coated on the non-bonding regions 4a, 4b and 5a of the core sheet 1, and the face sheets 2 and 3 are superposed on both sides of the core sheet 1 to form superposed sheets (laminate) 10 as shown in FIG. 15.

Figure 16:
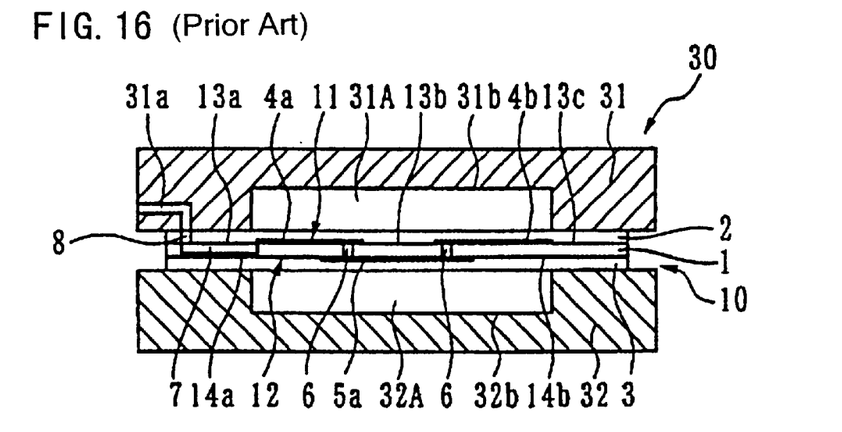
FIG. 16 is a section view of feature for explaining the conventional process.

Subsequently, the superposed sheets 10 are set in a molding die 30 consisting of a first molding die 31 and a second molding die 32, and air of a first molding die interior 31A and a second molding die interior 32A is replaced with an inert gas while boundaries 11 and 12 between the core sheet 1 and each of the face sheets 2 and 3 are evacuated. Then the superposed sheets 10 and the molding die 30 are wholly heated to a desired temperature, and an inert gas is introduced into the first molding die interior 31A and the second molding die interior 32A to a desired pressure to diffusively bond the core sheet 1 to bonding regions 13a, 13b, 13c, 14a and 14b of each of the face sheets 2 and 3. Thereafter, the inert gas within the interiors 31A and 32A is discharged.

Then, an inert gas is introduced into the non-bonding region 4a between the core sheet 1 and face sheet 2. The inert gas is fed from a hole for providing molding gas 31a opened on the first molding die 31 through the hole for feeding molding gas 8 and the groove for introducing molding gas 7. The inert gas introduced into the non-bonding region 4a having the anti-bonding agent 9 brings about superplastic deformation of the core sheet 1 and the face sheets 2 and 3 in the region corresponding to the non-bonding region 4a. Thereby the portions corresponding to the region 4a of these sheets are expanded to form a first enlarged room 15a. On the other hand, an inert gas is introduced into the non-bonding region 5a having the anti-bonding agent 9 through the gas hole 6, and consequently the core sheet 1 and the face sheets 2 and 3 are superplastically deformed in the region corresponding to the non-bonding region 5a to form a second enlarged room 15b.

Figure 17:
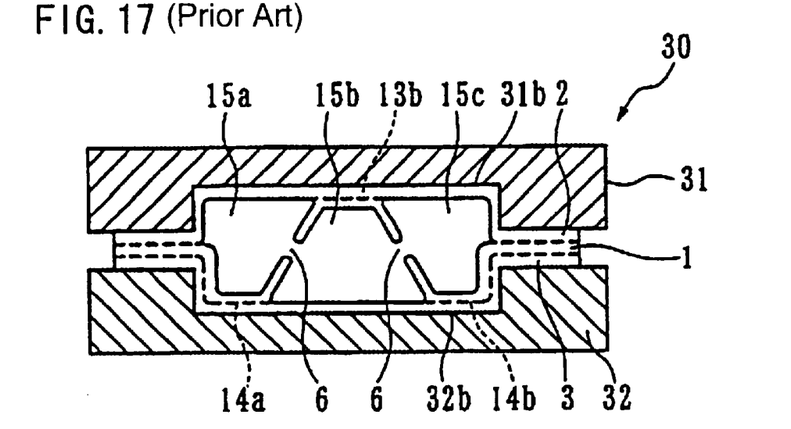
FIG. 17 is a section view of feature for explaining the conventional process.

Subsequently, the inert gas introduced into the second enlarged room 15b is further introduced into the non-bonding region 4b having the anti-bonding agent 9 through the gas hole 6, and consequently the core sheet 1 and the face sheets 2 and 3 in the region corresponding to the non-bonding region 4b are superplastically deformed to form a third enlarged room 15c. Thus, as shown in FIG. 17, the inert gas is introduced until the face sheet 2 is pressed to be contacted with a molding surface 31b of the first molding die 31 and the face sheet 3 is also pressed to be contacted with a molding surface 32b of the second molding die 32, and hence a product having a shape whose periphery reflects the molding surface 31b of the first molding die 31 and the molding surface 32b of the second molding die 32 is obtained.

The above-mentioned process for the monolithic molding of molding material using techniques such as superplastic molding and diffusion bonding, the technique comprising superposing plural titanium alloy sheets on which an anti-bonding agent is coated and introducing an inert gas into a molding die interior, is described in for example JP-A11-169977.

SUMMARY OF THE INVENTION

According to the prior art described above, constituent materials are superplastically molded and diffusively bonded to each other to be monolithically molded. Hence, even a product having a complicated shape can be rather easily molded, which results in simplification of process procedures and reduction of production cost as well as high strength of product.

Figure 18:
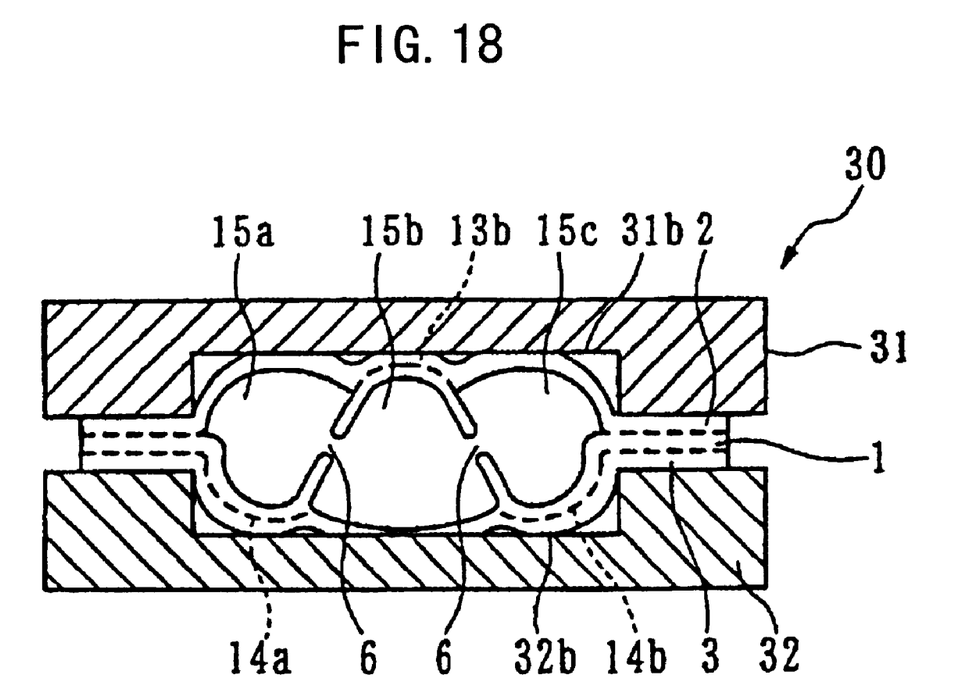
FIG. 18 is a view for explaining defective molding produced by the superplastic molding.

In the above superplastic molding, though a core sheet 1 is mainly superplastically deformed to provide a desired molded product, face sheets 2 and 3 putting the core sheet therebetween are also deformed during superplastic deformation of the core sheet due to their superpasticity. In the deformation, the face sheets are influenced especially by pressure introduced in non-bonding regions 4a and 4b, and hence, as shown in FIG. 18, portions corresponding to enlarged rooms 15a, 15b and 15c of the face sheets 2 and 3 are forced to expand whereby local expansions are generated in the portions corresponding to the enlarged rooms 15a, 15b and 15c of the face sheets 2 and 3. The local expansions occasionally cause wrinkles on the molded product.

The local expansions of the face sheets 2 and 3 can be avoided by an increase of thickness of the face sheets. However, the multi-layer hollow products obtained in the above techniques are desired to be light, and therefore the increased the thickness requires additional processing for reducing thickness of the face sheets 2 and 3 after the molding process. Further the yield of the products may reduce to increase the production cost.

In view of the above-mentioned problems, an object of the invention is to provide a process for the monolithic molding of superplastic material wherein generation of wrinkles on the molded product can be prevented by avoiding local expansion generated in the no-bonding regions of both sides (top and bottom sides) of three or more metal sheets (metal plates) when the metal plates are monolithically molded by means of superplastic molding.

The present invention to attain the object is provided by a process for the monolithic molding of superplastic material comprising the steps of:

provided at least three metal plates capable of superplastic molding and diffusion bonding, applying an anti-bonding agent onto regions of the plates to define bonding regions and non-bonding regions on the plates, bonding regions and non-bonding regions provided between the plates, superposing the metal plates one on another to form superposed plates, setting the superposed plates in a molding die, and heating the molding die interior to a molding temperature to diffusively bond superposed portions of the superposed plates to each other, the superposed portions corresponding to the bonding regions, and superplastically molding the metal plates by introducing a gas into the non-bonding regions to apply pressure to the regions;

wherein auxiliary plates for molding are placed on top and bottom sides of the superposed plates through the anti-bonding layer, respectively, the superposed plates and the auxiliary plates are set in the molding die, and a pressure lower than pressure applied to the non-bonding regions is applied to spaces between inner wall of the molding die and the auxiliary plates to control movement of the top and bottom plates whereby the superplastic molding is performed.

According to the above-mentioned invention, the auxiliary plates for molding are placed on top and bottom sides of the superposed plates, the superposed plates and the auxiliary plates are set in the molding die, superposed portions of the superposed plates corresponding to the bonding regions, are diffusively bonded to each other and the superposed plates are superplastically molded by introducing a gas into the non-bonding regions to apply pressure to the regions while a pressure lower than pressure applied to the non-bonding regions is applied to spaces between inner wall of the molding die and the auxiliary plates. Thus, when the top and bottom metal plates of the superposed metals are superplastically molded, deformation of the top and bottom plates is controlled by the auxiliary plates pressed from behind, whereby generation of wrinkles on the molded product can be prevented by avoiding local expansion generated in the non-bonding regions of the metal plates.

Another invention to attain the object is provided by a process for the monolithic molding of superplastic material comprising the steps of:

providing at least three metal plates capable of superplastic molding, applying an anti-bonding agent onto regions of the plates to define bonding regions and non-bonding regions on the plates, bonding regions and non-bonding regions provided between the plates, bonding the portions corresponding to the bonding portion of the plates one on another to form superposed plates, setting the superposed plates in a molding die, and heating the molding die interior to a molding temperature to superplastically molding the metal plates by introducing a gas into the non-bonding regions to apply pressure to the regions;

wherein auxiliary plates for molding are placed on top and bottom sides of the superposed plates through the anti-bonding layer, respectively, the superposed plates and the auxiliary plates are set in the molding die, and a pressure lower than pressure applied to the non-bonding regions is applied to spaces between inner wall of the molding die and the auxiliary plates to control movement of the top and bottom plates whereby the superplastic molding is performed.

According to the above-mentioned invention, the portions corresponding to the bonding portion of the metal plates are beforehand bonded one on another to form superposed plates, the superposed plates and the auxiliary plates are set in the molding die, superposed portions of the superposed plates are bonded to each other and the superposed plates are superplastically molded by introducing a gas into the non-bonding regions to apply pressure to the regions while a pressure lower than pressure applied to the non-bonding regions is applied to spaces between inner wall of the molding die and the auxiliary plates. Thus, when the top and bottom metal plates of the superposed metals are superplastically molded, movement of the top and bottom plates is controlled by the auxiliary plates pressed from behind, whereby generation of wrinkles on the molded product can be prevented by avoiding local expansion generated in the no-bonding regions of the metal plates.

In the above-mentioned processes for the monolithic molding of superplastic material, the anti-bonding agent is preferably coated onto outer surfaces (i.e., free surfaces) of the auxiliary plates for molding. According to the invention, the auxiliary plates used for control of shape of the metal plates on the molding can be easily removed from the molding die, whereby the processing of the molding is enhanced in efficiency.

A further invention to attain the object is provided by a process for the monolithic molding of superplastic material comprising the steps of:

providing at least three metal plates capable of superplastic molding and diffusion bonding, applying an anti-bonding agent onto regions of the plates to define bonding regions and non-bonding regions on the plates, bonding regions and non-bonding regions provided between the plates, superposing the metal plates one on another to form superposed plates, setting the superposed plates in a molding die, and superplastically molding the metal plates by introducing a gas into the non-bonding regions to apply pressure to the regions;

wherein a groove connecting an end portion of one plate of the superposed plates (face sheet or core sheet) to one of the non-bonding regions is provided on the one plate, a stainless steel pipe having no superplastcicity is fitted into the groove, periphery of the pipe is sealed, all the plates constituting the superposed plates are superposed one on another and pressure is applied by introducing an insert gas into the stainless steel tube.

A groove (passage) directly provided on the face sheet or the core sheet is reduced in the diameter by pressure and heat (high temperature) of jig to increase resistance, and therefore time period for feeding molding gas is made longer. According to the above invention, the passage is not reduced in the dimension by fitting the stainless pipe into the passage and hence the feeding molding gas is not inhibited.

DETAILED DESCRIPTION OF THE INVENTION

The embodiment of the process for the monolithic molding of superplastic metal according to the invention is explained with reference to Figures. The parts corresponding to those of FIGS. 14 to 18 are given the same reference numbers for convenience.

First Embodiment

The first embodiment of the invention is explained with reference to FIGS. 1 to 11.

Figure 1:
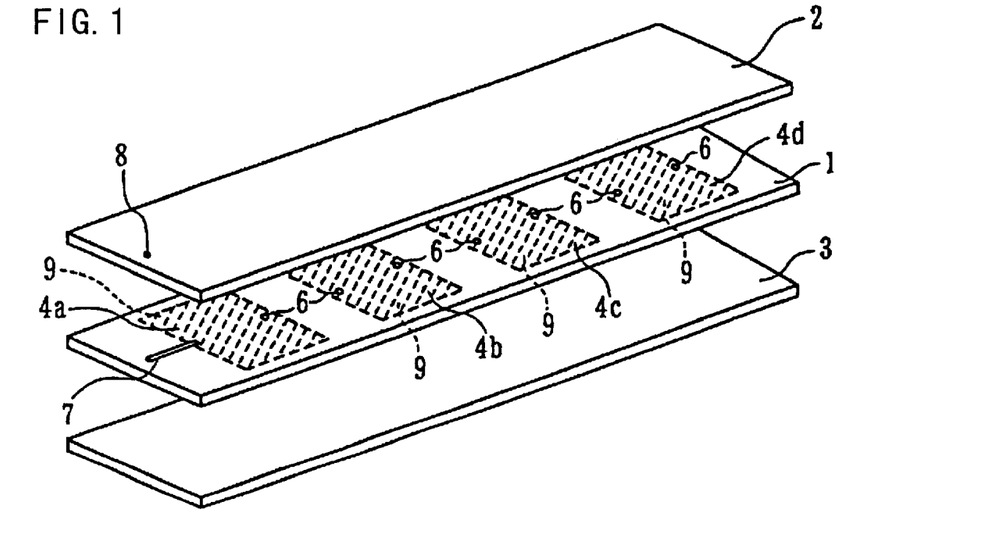
FIG. 1 is a perspective view for explaining a first embodiment of the process for the monolithic molding of superplastic metal according to the invention.

First, three metal plates capable of superplastic molding and diffusion bonding 1, 2 and 3 are prepared. Examples of materials of the metal plates include titanium alloys, superplastic aluminum alloys and superplastic stainless steels such as Ti-6Al-4V, Ti-4.5Al-3V-2Fe-2Mo and Ti-6Al-6V-2Sn. When the metal plates 1, 2 and 3 are superposed as shown in FIG. 1, the metal plate (core sheet) 1 lies between the metal plates 2 and 3. Non-bonding regions 4a, 4b, 4c, 4d are provided on one side of the core sheet, while non-bonding regions 5a, 5b and 5c (see FIG. 2) are provided on the other side of the core sheet such that the non-bonding regions are locally overlapped with the non-bonding regions 4a, 4b, 4c, 4d as seen on plane surface. On each of the portions where the non-bonding regions 5a, 5b and 5c are locally overlapped with the non-bonding regions 4a, 4b, 4c, 4d as seen on plane surface, gas holes 6 are provided and further a groove for introducing molding gas 7 is formed on the core sheet 1 to be in contact with one end of the non-bonding region 4a.

The core-sheet 1 is put between face sheets 2 and 3, which are the above top and bottom metal plate. A hole for feeding molding gas 8 is provided in the face sheet 2. The hole for feeding molding gas 8 is connected to one end of a passage for introducing molding gas, which is made up of a groove for introducing molding gas 7 and the face sheet 2 when the face sheet 2 is superposed on the core sheet 1.

Figure 2:
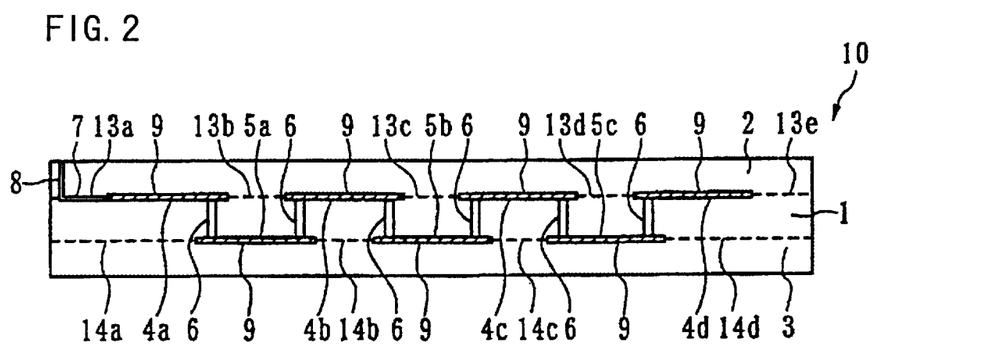
FIG. 2 is a section view of feature for explaining the above first embodiment.

An anti-bonding agent 9 (e.g., Yttria) is coated on the non-bonding regions 4a, 4b, 4c, 4d and 5a, 5b, 5c of the core sheet 1, and the face sheets 2 and 3 are superposed on both sides of the core sheet 1 to form superposed sheets 10 (also referred to as laminate) as shown in FIG. 2.

Figure 3:
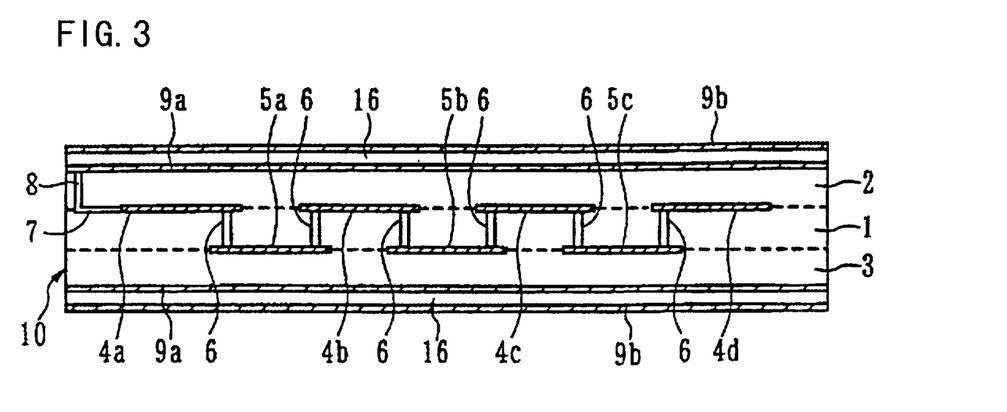
FIG. 3 is a section view of feature for explaining the above first embodiment, similarly.

Subsequently, auxiliary plates for molding 16 are superposed on outer surfaces of the face sheets 2 and 3 through the coated layer 9a consisting of the anti-bonding agent 9 as shown in FIG. 3. Further, the superposed sheets 10 put between the auxiliary plates for molding 16 are set in a molding die 30 consisting of a first molding die 31 and a second molding die 32, and compressive load is applied onto the molding die 32 using for example an oil pressure press to seal the molding die interior. A hole connected to the hole for feeding molding gas 8 of the face sheet 2 is provided in the auxiliary plates 16 for molding of the face sheets 2.

Here, as the auxiliary plates 16, low cost materials which exhibit a deformation stress higher than that of the face sheets 2 and 3 at molding temperature of the superplastic molding step and have tens of percent elongation can be employed. In case there are no appropriate materials, the same materials as the face sheets 2 and 3 may be used.

A thickness of the auxiliary plates 16 for molding is determined depending upon the kind of the materials for molding, height and shape of the molded product. The thickness of the auxiliary plates is preferably increased, with reduction of difference of deformation stress between the auxiliary plates 16 and the face sheet 2 or 3, with increase of thickness of the core sheet in the case of small thickness of the face sheets 2, 3, with increase of the height of the molded product in case of large bonded space of face sheets 2, 3 and core sheet 1, and with increase of minimum radius of curvature in corner portions of the molded product. Further, it is preferred that the anti-bonding agent 9b is coated onto outer surfaces of the auxiliary plates 16 for molding to facilitate removal of the plates from the molding die after molding.

Figure 4:
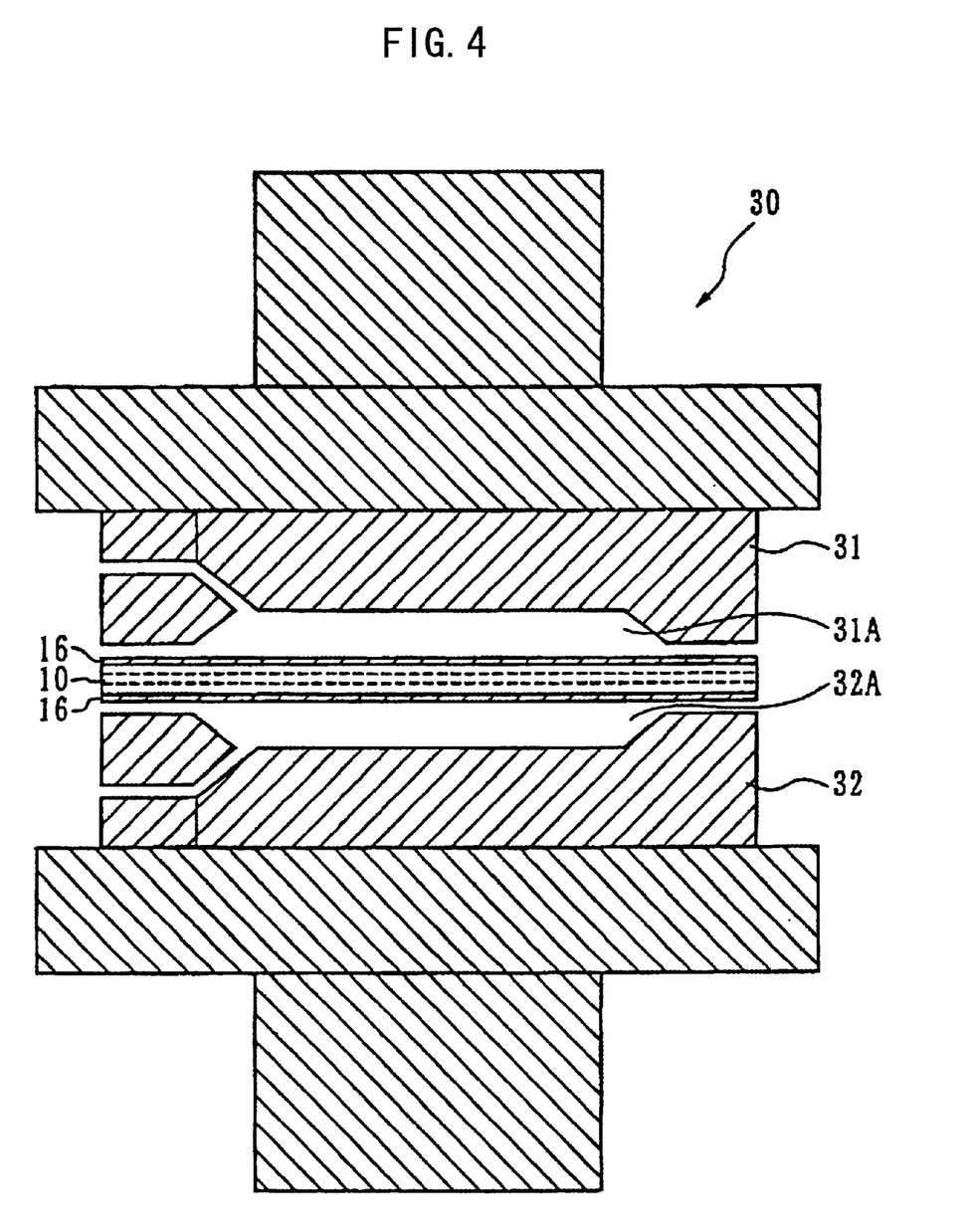
FIG. 4 is a section view of feature for explaining the above first embodiment, similarly.
Figure 5:
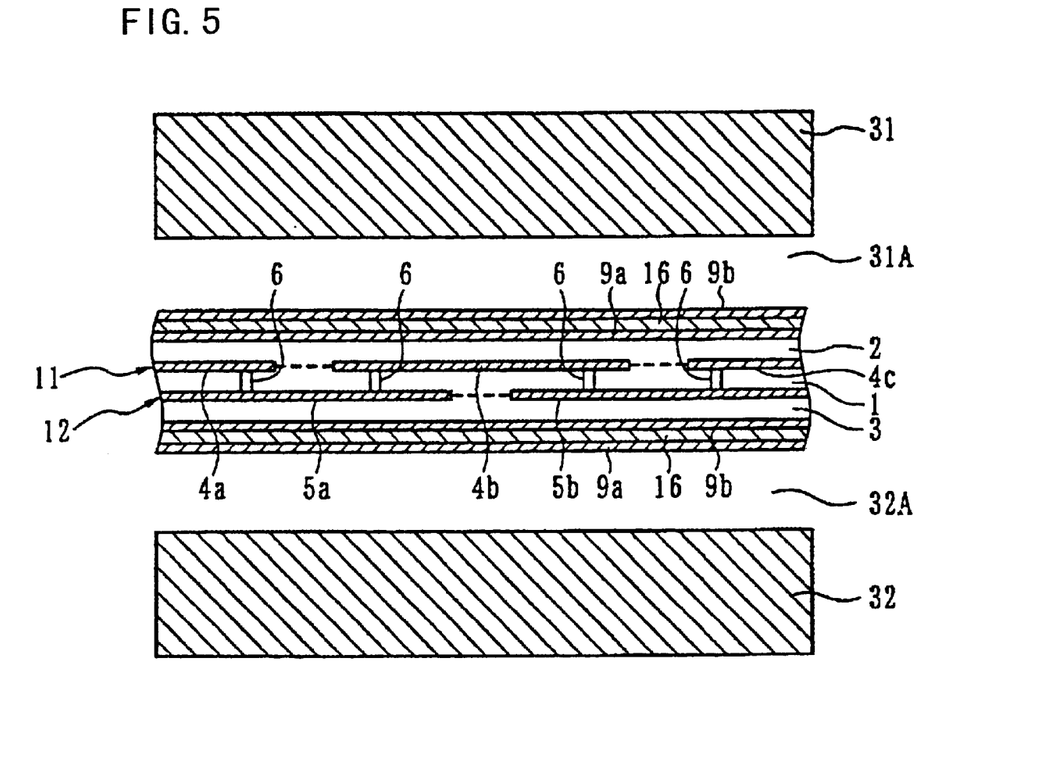
FIG. 5 is a section view of feature for explaining the above first embodiment, similarly.
Figure 6:
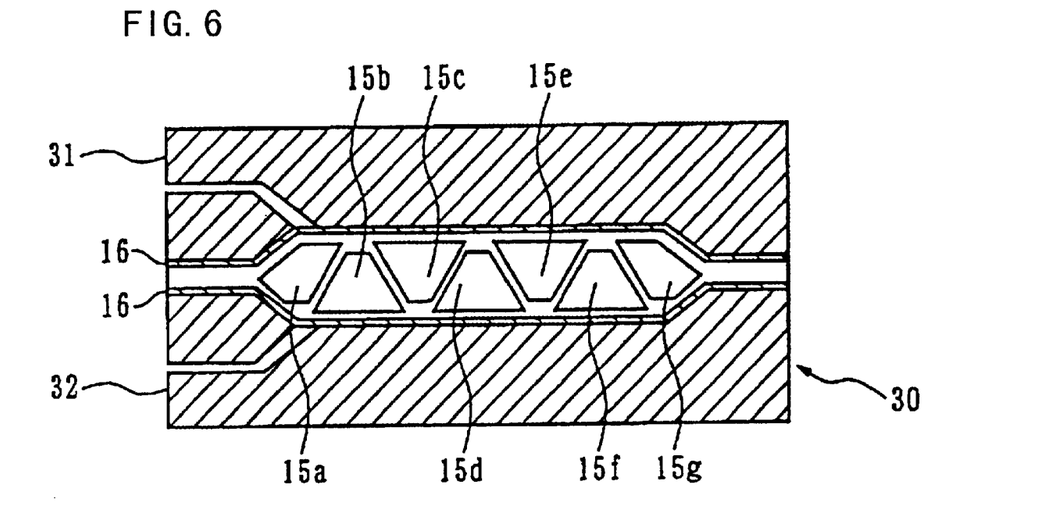
FIG. 6 is a section view of feature for explaining the above first embodiment, similarly.
Figure 7:
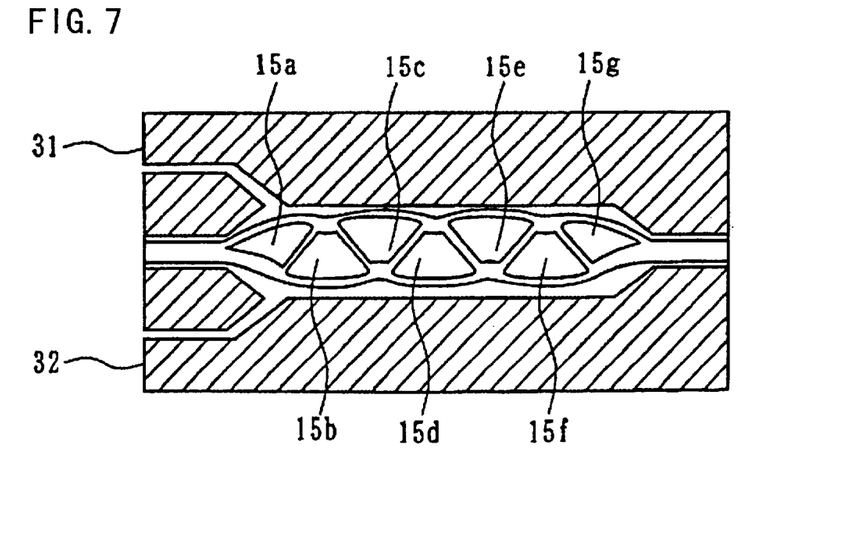
FIG. 7 is a section view of feature for explaining the above first embodiment, similarly.

After the superposed plates 10 put between the auxiliary plates 16 are set in the molding die 30, air in a first molding die interior 31A and a second molding die interior 32A is replaced with an inert gas while boundaries 11 and 12 between the core sheet 1 and each of the face sheets 2 and 3 are evacuated as shown in FIG. 5 (partial enlarged view of FIG. 4). Then the superposed sheets 10 and the molding die 30 are wholly heated to a desired temperature, and an inert gas is introduced into the first molding die interior 31A and the second molding die interior 32A to a desired pressure to diffusively bond the core sheet 1 to bonding regions 13a, 13b, 13c, 13d, 13e and 14a, 14b, 14c, 14d of the face sheets 2 and 3 (refer to FIG. 2). Thereafter, the inert gas within the interiors 31A and 32A is discharged.

Then, an inert gas is introduced into the non-bonding region 4a between the core sheet 1 and face sheet 2. The introduction of the inert gas is carried out from a hole for providing molding gas 31 a (not shown in figure) opened on the first molding die 31 through the hole for feeding molding gas 8 and the groove for introducing molding gas 7.

The inert gas introduced into the non-bonding region 4a having the anti-bonding agent 9 brings about superplastic deformation of the core sheet 1 and the face sheets 2 and 3 in the region corresponding to the non-bonding region 4a. Thereby the portions corresponding to the region 4a of these sheets are expanded to form a first enlarged room 15a. On the other hand, an inert gas is introduced into the non-bonding region 5a having the anti-bonding agent 9 through the gas hole 6 connecting the top and bottom surfaces of the core sheet 1 to each other to apply pressure to the region, and thus the core sheet 1 and the face sheets 2 and 3 are superplastically deformed in the region corresponding to the non-bonding region 5a to form a second enlarged room 15b.

Subsequently, the inert gas introduced into the second enlarged room 15b is further introduced into the non-bonding region 4b having the anti-bonding agent 9 through the gas hole 6, and therefore the core sheet 1 and the face sheets 2 and 3 in the region corresponding to the non-bonding region 4b are superplastically deformed to form a third enlarged room 15c.

Moreover, the inert gas is introduced into the non-bonding regions 5b, 4c, 5c and 4d in order, and the core sheet 1 and the face sheets 2 and 3 in each region corresponding to each non-bonding region are superplastically deformed in the same manner to form a fourth enlarged room 15d, a fifth enlarged room 15e, a sixth enlarged room 15f and a seventh enlarged room 15g.

In the superplastic deformation step, a pressure lower than pressure applied to the non-bonding regions 4a, 4b, 4c, 4d, 5a, 5b and 5c is applied to spaces between inner wall of the molding die 30 and the auxiliary plates for molding 16 (the first molding die interior 31A and the second molding die interior 32A) to apply appropriate pressure to backs of the auxiliary plates 16, whereby the portions corresponding to the non-bonding regions 4a, 4b, 4c, 4d, 5a, 5b and 5c of the face sheets 2 and 3 in the above formation of the above enlarged rooms by superplastic molding are prevented from being locally expanded by existence of the auxiliary plates 16. In case the auxiliary plates 16 to which the appropriate pressure is applied are not present, the local expansions in the portions corresponding to the non-bonding regions 4a, 4b, 4c, 4d, 5a, 5b and 5c of the face sheets 2 and 3 are generated, and the local expansions creates wrinkles on the molded product.

Figure 8:
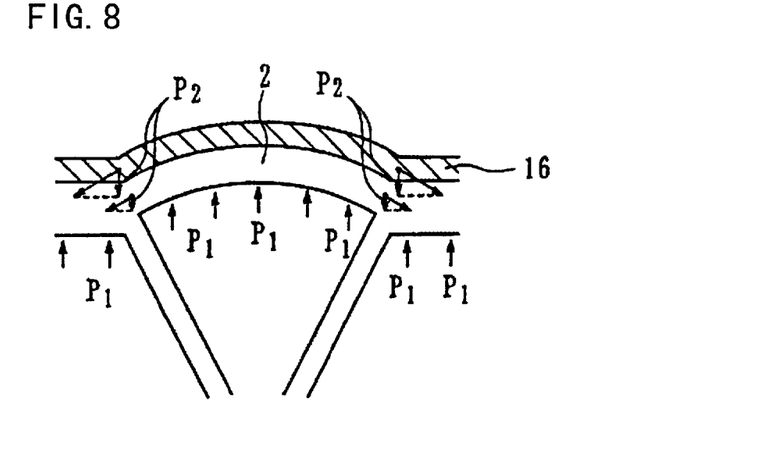
FIG. 8 is a section view for explaining pressure distribution on the superplastic molding.

In more detail, on the superplastic deformation, a molding pressure P1 is applied to the inner side of the face sheet 2, whereas, when the auxiliary plate 16 for molding having high deformation stress are arranged on the outer side of the face sheet 2 so as to remove space therebetween, the molding pressure P1 causes deformations of the face sheet 2 and auxiliary plates 16, and thus a tension component in the upper and lower direction P2 generated by the deformations and the molding pressure P1 are balanced with each other. Here, in case a large deformation pressure is generated in the auxiliary plate 16, the above molding pressure P1 can be supported by small deformation of the auxiliary plate 16 given by the large deformation stress. Hence, the deformation of the face sheet 2 depends on deformation rate of the auxiliary plate 16, which does not greatly extend, and hence the local expansion of the face sheet 2 is depressed.

Figure 9:
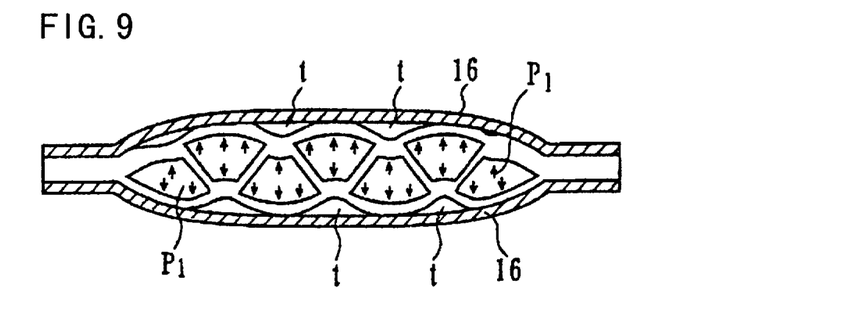
FIG. 9 is a section view for explaining pressure distribution on the superplastic molding.
Figure 10:
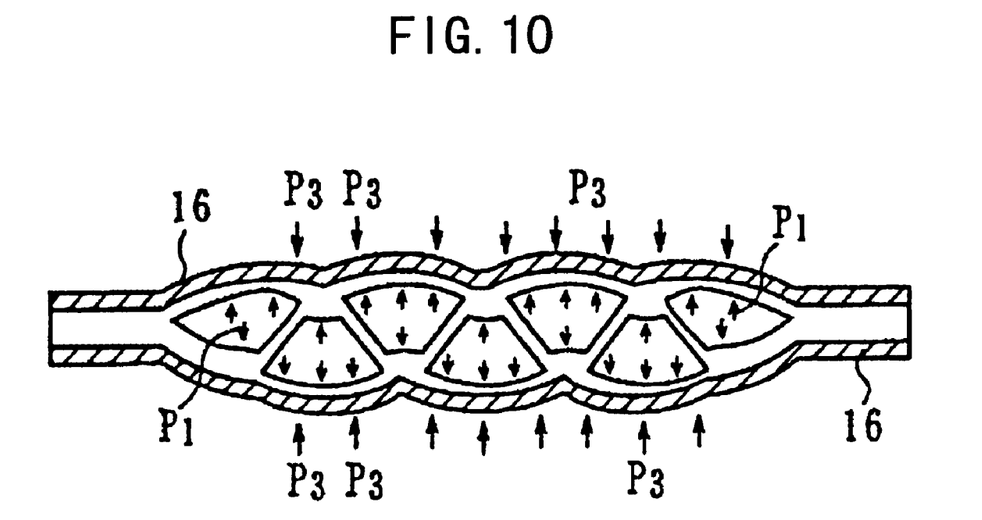
FIG. 10 is a section view for explaining pressure distribution on the superplastic molding.

Thus, it is necessary to arrange the auxiliary sheet 16 on the outer side of the face sheet 2 without space between the sheets. When space t is present between the face sheet 2 and the auxiliary plate 16 as shown in FIG. 9, it is difficult to obtain the above-mentioned effect by the auxiliary plate for molding 16. Therefore it is essential to apply a desired pressure P3 from behind the auxiliary plate 16 as shown in FIG. 10, and therefore it is preferred that the molding pressure P1 has an ordinary molding pressure increased by an amount corresponding to the pressure P3.

In case the top and bottom sides of the superposed metal plates (i.e., face sheets 2 and 3) are superplastically molded, the outer surfaces of the face sheets are controlled by the auxiliary plates so that the pressure P3 is applied to the backs of the face sheets. Therefore, the local expansions in the portions corresponding to the non-bonding regions 4a, 4b, 4c, 4d, 5a, 5b and 5c of the face sheets 2 and 3 are prevented or depressed, and therefore occurrence of wrinkles on the molded product can be avoided.

Here, difference between pressure introduced into the first molding die interior 31A and second molding die interior 32A and the pressure introduced into the space between the non-bonding regions is set such that an appropriate stress is applied to the outer surfaces of the face sheets 2 and 3 when the core sheet 1 and face sheets 2, 3 are superplastically deformed. For instance, the difference can be obtained according to numerical calculation simulation of the superplastic molding.

A molded product obtained by the above-mentioned steps is discharged from the molding die 30, and its shape is adjusted by a trimming processing etc. to obtain a product.

Figure 11:
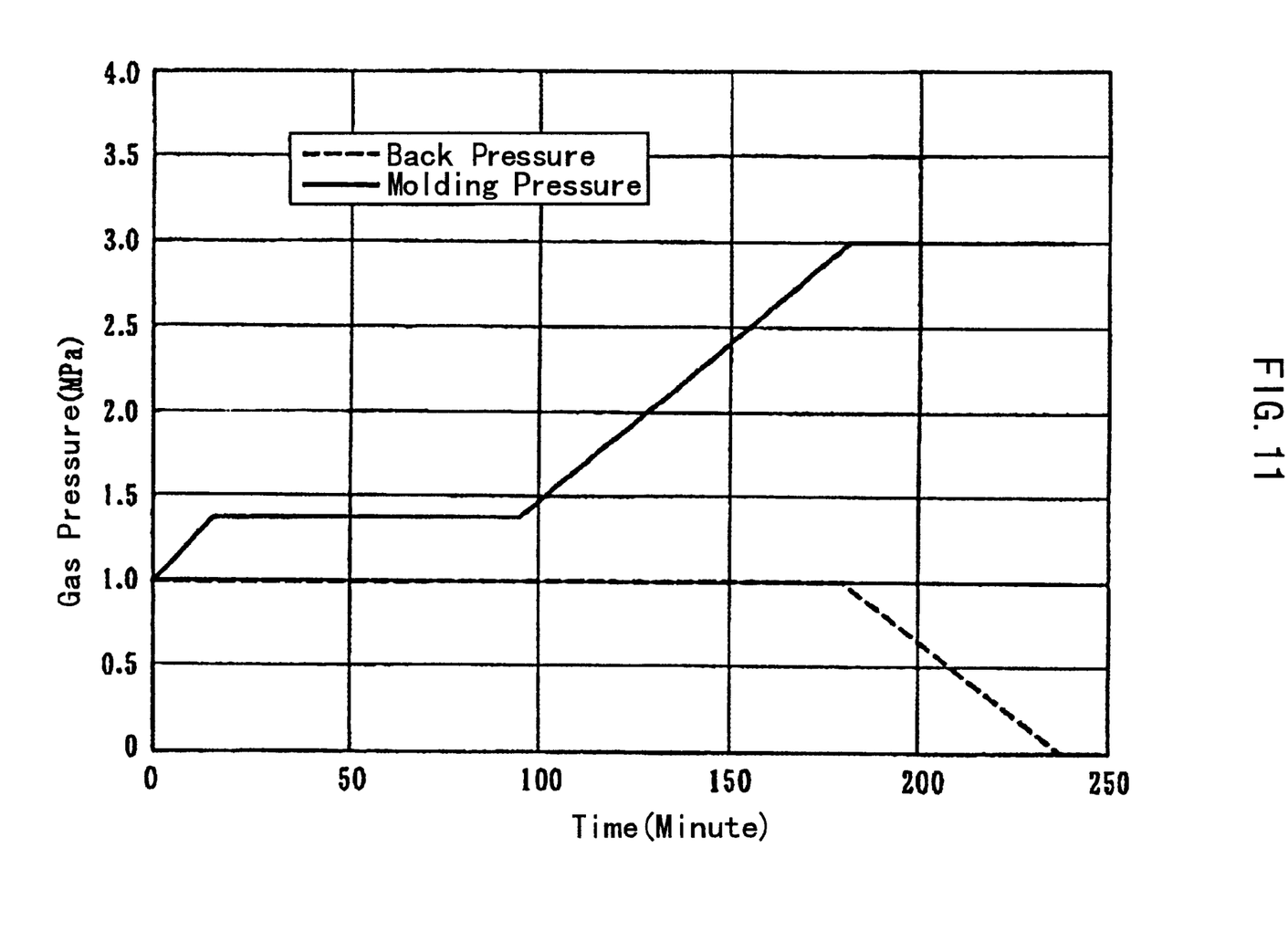
FIG. 11 is a view showing an example of pressure control on the superplastic molding.

According to the procedures indicated in FIGS. 1 and 2, a titanium alloy (Ti-6Al-4V) having a thickness of 0.63 mm was employed as the core sheet 1 and the face sheets 2 and 3, Yttria employed as the anti-bonding agent, and the core sheet 1 and the face sheets 2 and 3 were superposed to provide the superposed plates (laminate) 10. Subsequently, a stainless steel (SUS 301) having a thickness of 0.5 mm was employed as the auxiliary plate 16 for molding, and the auxiliary plates 16 were superposed on the outer sides of the superposed plates 10 through the coated layer of Yttria as shown in FIG. 3, and then set in the molding die 30 as shown in FIG. 4. Subsequently, the superposed plates 10 put between the molding die through the auxiliary plates 16 were heated to 900° C. while argon gas was introduced into the molding die interior to apply pressure of 3.0 MPa to the molding die for two hours whereby diffusion bonding was performed. Then, after the argon gas was discharged out of the molding die interior, an inert gas was introduced into the non-bonding region of the superposed plates to apply molding pressure to the region while pressure lower than the molding pressure was applied to the backs of the auxiliary plates (back pressure), whereby superplastic molding was performed. In this case, data showing control of the molding pressure and the back pressure are indicated in FIG. 11.

As a result of the above superplastic molding under control of these pressures, the local expansions of the portions corresponding to the non-bonding regions of the face sheets were avoided and no wrinkles were generated on the surface of the molded product.

Second Embodiment

The second embodiment of the invention is explained with reference to FIGS. 12 and 13.

Figure 12:
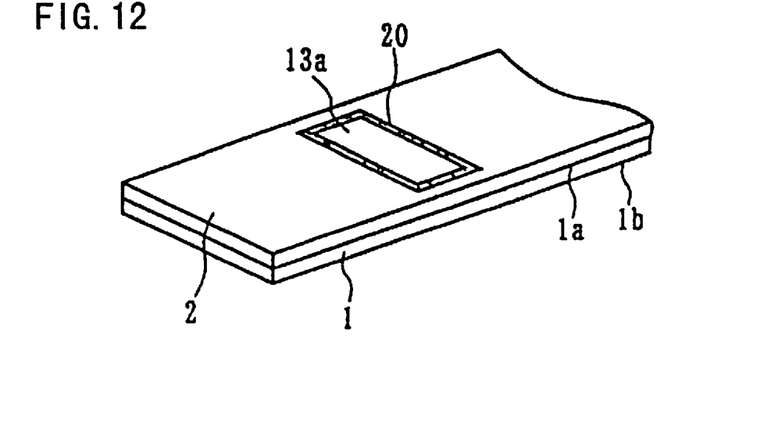
FIG. 12 is a perspective view for explaining a second embodiment of the process for the monolithic molding of superplastic metal according to the invention.
Figure 13:
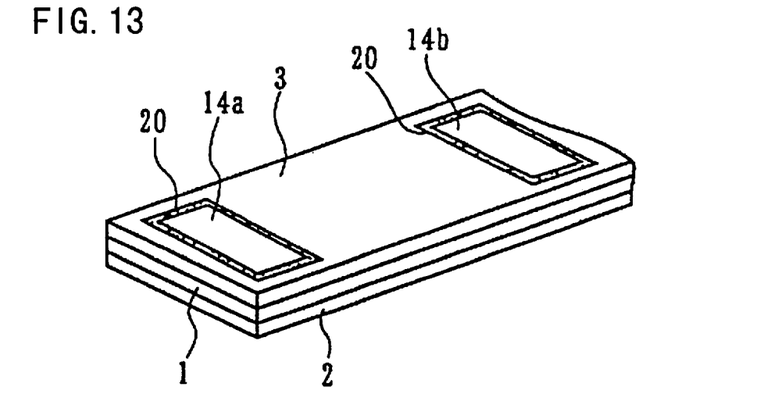
FIG. 13 is a perspective view for explaining feature of the above second embodiment.

The second embodiment is carried out by changing the step in which a core sheet 1 and face sheets 2 and 3 are superposed to form superposed plates 10 as shown in FIGS. 1 and 2 into the step as shown in FIGS. 12 and 13. In more detail, a face sheet 2 is superposed on one side 1a of a core sheet 1 as shown in FIG. 12, and the periphery of each of bonding regions 13a to 13e (the bonding region 13a is indicated in FIG. 12) is welded to each other by means of an electron beam welding under vacuum to form electron beam welded portions 20, while a face sheet 3 is superposed on the other side 1b of the core sheet 1 to which the face sheet 2 has been welded to weld periphery of each of bonding regions 14a to 14d (the bonding regions 14a and 14b are indicated in FIG. 13) by means of an electron beam welding to form welded portions 20. These bonding regions 13a to 13e and 14a to 14d are maintained in vacuumed condition because the peripheries are sealed.

The obtained laminate 10 is set in a molding die 30 in the same manner as the first embodiment, and then subjected to superplastic molding in the same manner as the first embodiment.

According to the second embodiment, the bonding regions are welded to each other by the electron beam welding, whereby the bonding regions can be maintained in vacuumed condition and therefore the superplastic molding and diffusion bonding both can be simultaneously proceeded to reduce molding time period. Further, the non-bonding regions are not diffusively bonded and hence application of anti-bonding agent can be omitted, and reduction of number of process (step) and of production cost can be obtained. Furthermore, pre-bonding of the bonding regions by the electron beam welding facilitates the superplastic molding of materials that can be diffusively bonded.

Moreover, diffusion bonding (i.e., liquid interface diffusion bonding) in which bonded portions of the bonding regions are treated with inserting material (for example metalized with Cu—Ni), can be also performed in the same manner as the procedures mentioned above. Hence, the process of the invention can be conducted in such appropriately changed manners that are not restricted by the above embodiment so long as it is not deviated from the scope of the invention.

In the above embodiment, as a gas passage for feeding a molding gas between a core sheet 16 and face sheets 2 and 3, a hole for feeding molding gas 8 penetrating the face sheet in the thickness direction is provided. However, it is preferred that a groove for introducing molding gas 7 is extended to the end of the core sheet 16 and a stainless pipe having no superplasticity is fitted in the groove, the periphery of the groove being sealed, and then the face sheet 2 is superposed. The passage directly provided in the face sheet or core sheet increases resistance against introduction of gas because the size of the passage is reduced due to pressure of the die and high temperature, whereby the time period for feeding molding gas is made longer. The use of the stainless pipe depresses reduction of the passage size and therefore prevents the feeding molding gas from being inhibited.

(Effect of the Invention)

According to the process for the monolithic molding of superplastic material of the invention explained above, in case the auxiliary plates for molding are placed on top and bottom sides of the superposed plates, and the auxiliary plates and the superposed plates are set in the molding die, and then superplastic molding is performed, a pressure lower than pressure applied to the non-bonding regions is applied to spaces between inner wall of the molding die and the auxiliary plates. Thereby, movement of the top and bottom plates is controlled by the auxiliary plates pressed from behind when the top and bottom metal plates of the superposed metals are superplastically molded by introducing a gas into the non-bonding regions, whereby occurrence of local expansion in the non-bonding regions of the metal plates can be avoided to prevent occurrence of wrinkles on the molded product. Thus, high quality superplastic product can be obtained and the yield of the product is also enhanced.

While the presently preferred embodiment of the present invention has been shown and described, it is to be understood that this disclosure is for the purpose of illustration and that various changes and modifications may be made without departing from the scope of the invention as set forth in the appended claims.

The disclosure of the Japanese priority application No. 2000-201110, dated Jul. 3, 2000, is hereby incorporated by reference.

I claim:

1. A process for the monolithic molding of superplastic material comprising:

provided at least three metal plates capable of superplastic molding and diffusion bonding, applying an anti-bonding agent onto regions of the plates to define bonding regions and non-bonding regions on the plates, bonding regions and non-bonding regions provided between the plates, superposing the metal plates one on another to form superposed plates, setting the superposed plates in a molding die, and heating the molding die interior to a molding temperature to diffusively bond superposed portions of the superposed plates to each other, the superposed portions corresponding to the bonding regions, and superplastically molding the metal plates by introducing a gas into the non-bonding regions to apply pressure to the regions;

wherein auxiliary plates for molding are placed on top and bottom sides of the superposed plates, respectively, the superposed plates and the auxiliary plates are set in the molding die, and a pressure lower than pressure applied to the non-bonding regions is applied to spaces between the inner wall of the molding die and the auxiliary plates to control movement of the top and bottom plates whereby the superplastic molding is performed.

2. The process for the monolithic molding of superplastic material as defined in claim 1, the anti-bonding agent is coated onto outer surfaces of the auxiliary plates for molding.

3. A process for the monolithic molding of superplastic material comprising:

providing at least three metal plates capable of superplastic molding, applying an anti-bonding agent onto regions of the plates to define bonding regions and non-bonding regions on the plates, bonding regions and non-bonding regions provided between the plates, bonding the portions corresponding to the bonding portion of the plates one on another to form superposed plates, setting the superposed plates in a molding die, and heating the molding die interior to a molding temperature to superplastically mold the metal plates by introducing a gas into the non-bonding regions to apply pressure to the regions;

wherein auxiliary plates for molding are placed on top and bottom sides of the superposed plates, respectively, the superposed plates and the auxiliary plates are set in the molding die, and a pressure lower than pressure applied to the non-bonding regions is applied to spaces between the inner wall of the molding die and the auxiliary plates to control movement of the top and bottom plates whereby the superplastic molding is performed.

4. The process for the monolithic molding of superplastic material as defined in claim 3, the anti-bonding agent is coated onto outer surfaces of the auxiliary plates for molding.

* * * * *